United States Patent [19]

Binder et al.

[11] Patent Number: 4,536,820

[45] Date of Patent: Aug. 20, 1985

[54] ELECTRICAL FEEDTHROUGH MEANS FOR PRESSURE TRANSDUCER

[75] Inventors: Paul B. Binder, North Wales; Paul M. Kroninger, Jr., Harleysville, both of Pa.

[73] Assignee: General Signal Corporation, Stamford, Conn.

[21] Appl. No.: 594,585

[22] Filed: Mar. 29, 1984

[51] Int. Cl.³ .............................................. H01G 7/00
[52] U.S. Cl. .................................................... 361/283
[58] Field of Search ............................ 361/283; 73/718

[56] References Cited

U.S. PATENT DOCUMENTS

| 4,257,274 | 3/1981 | Shimada et al. ............... 361/283 X |
| 4,427,842 | 1/1984 | Anderson ........................... 174/77 R |
| 4,499,773 | 2/1985 | Crampton et al. ..................... 73/718 |

Primary Examiner—Donald A. Griffin
Attorney, Agent, or Firm—Harold Huberfeld; William G. Miller, Jr.

[57] ABSTRACT

A bulkhead feedthrough for capacitive pressure transducers including a feedthrough body portion welded in a cylindrical opening in a pressure receiving body in which the transducer is mounted. The feedthrough body provides a pressure seal for the transducer cavity and carries conducting rods in holes in the body. The rods are insulated from the body and holes are drilled in the end of each rod from the transducer side to receive spring loaded plunger type contacts which are inserted in the holes so that the plunger protrudes to contact the transducer elements. The dimensions of the feedthrough body and the thermal coefficient of expansion are such that the space between the feedthrough body and the pressure receiving body varies with temperature changes so that the resulting volume changes are sufficient to compensate for the changes in volume of the silicone oil in the transducer cavities.

5 Claims, 5 Drawing Figures

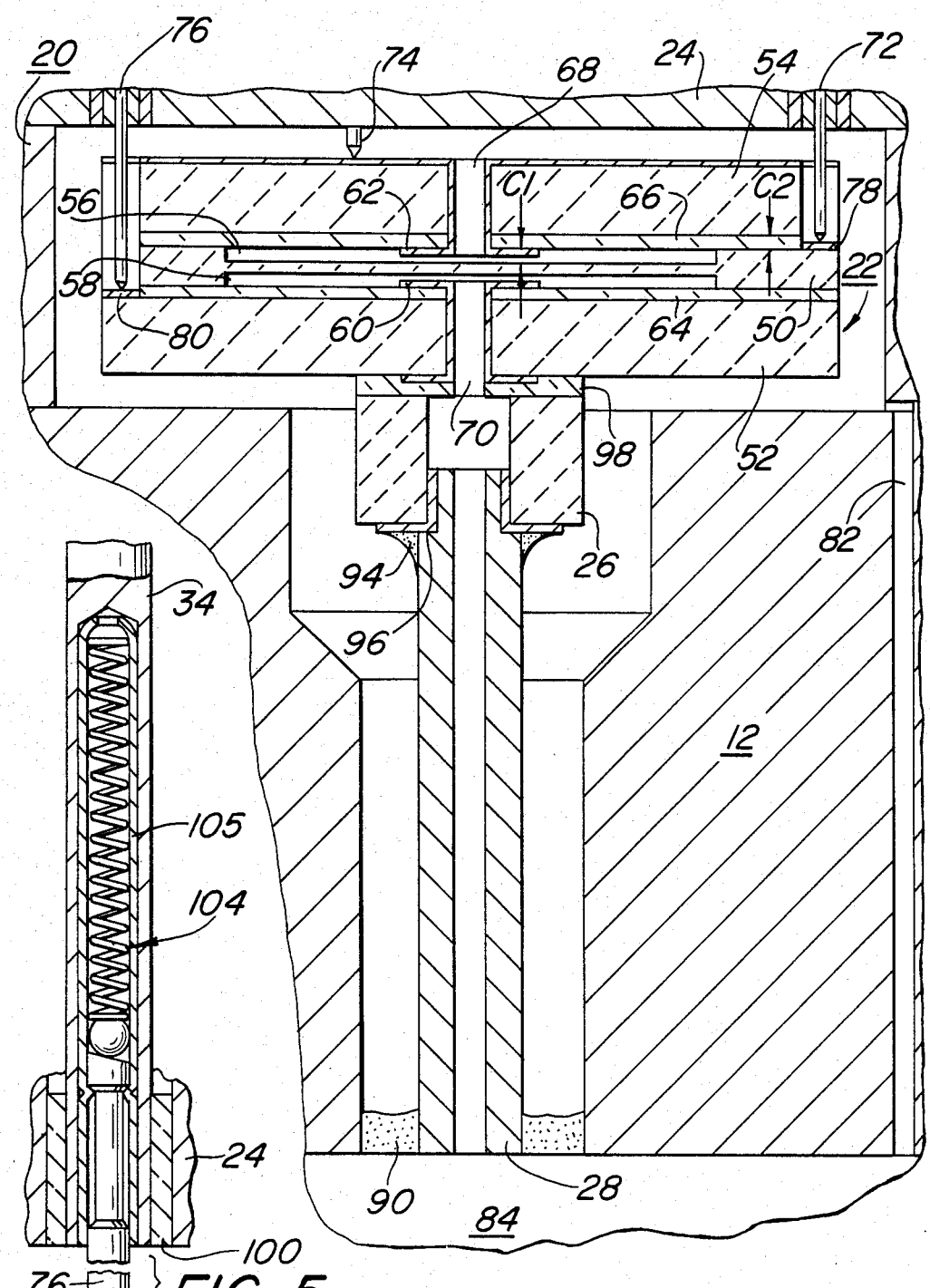

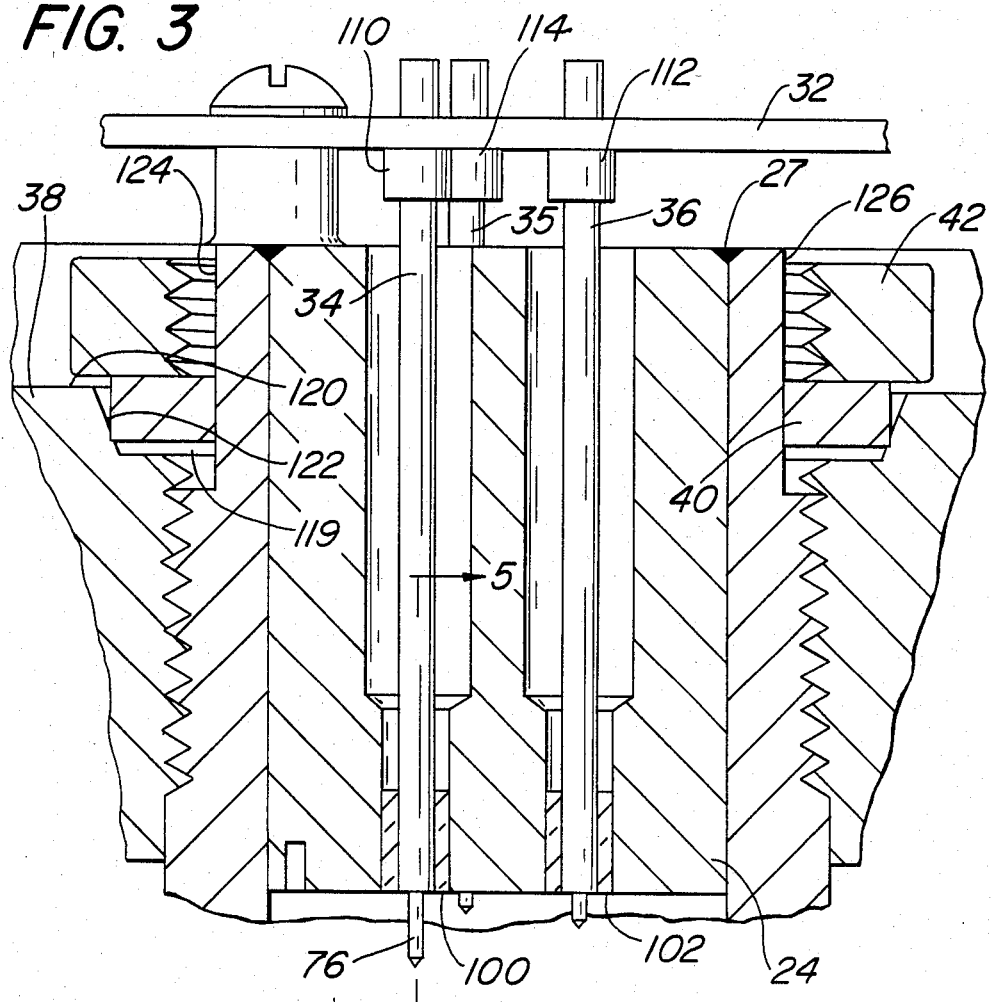
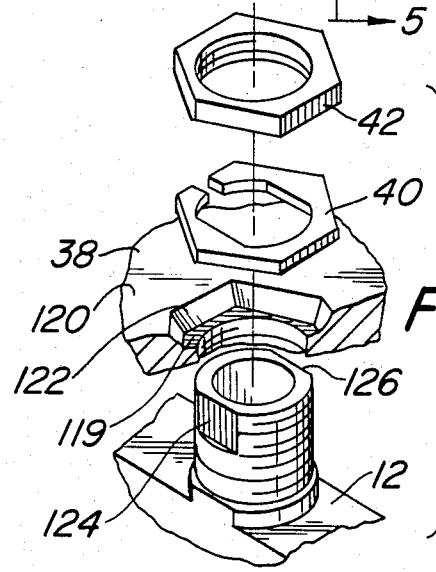

ELECTRICAL FEEDTHROUGH MEANS FOR PRESSURE TRANSDUCER

BACKGROUND OF THE INVENTION

The present invention relates to electrical feedthroughs and more particularly to feedthroughs which include electrical contact means for making electrical connections to pressure transducers used for sensing a pressure or a differential pressure. More specifically this invention relates to an electrical feedthrough and contact means for pressure transducers of the capacitive type.

Capacitive type pressure transducers in which the present invention is useful include the type which utilize a silicon diaphragm and silicon plates both made from highly doped silicon. The plates may be anodically bonded to the diaphragm with material removed from the plates and diaphragm to provide contact areas which are all accessable from one side. In such transducers it is necessary to provide a means for connecting the elements of the transducer to the circuit board which carries the associated circuitry. This circuit board is usually located in the housing of the transducer assembly in a region which is not subjected to the high line pressures to which the transducer is exposed. It is thus necessary to electrically connect the transducer to the circuit board through a pressure sealing arrangement or bulkhead.

Certain prior art transducer assemblies have used leaf type springs to make contact between the transducer and the circuit board others have used direct soldered wiring connections. These arrangements have made it difficult to minimize the volume of silicone oil contained in the cavities of the transducer, for they both take up an excessive amount of space by the very nature of their construction. It should be recognized that it is very important to minimize the volume of silicone oil or other fluid medium in the cavities of the transducer assembly in order to minimize the effect of pressure changes and temperature changes on that fluid and hence on the transducer output.

It is an object of the present invention to provide a feedthrough for a pressure transducer which is simple, inexpensive to manufacture and easy to assemble.

It is also an object of this invention to provide a feedthrough for pressure transducers which takes up only a minimum space in the cavities of the transducer.

SUMMARY OF THE INVENTION

For pressure transducer assemblies having an electrical circuit mounted in a housing of the assembly subjected to ambient pressure conditions and a pressure transducer mounted in a cavity of the assembly which is subjected to high line pressures, there is provided a feedthrough contact means in the bulkhead of the assembly for electrically connecting the circuit and the transducer while sealing the high line pressure in the cavity. For this purpose, the present invention uses a bulkhead or feedthrough body portion for providing a pressure seal for the cavity and at least one electrically conducting rod carried by the feedthrough body portion. The rod extends from the circuit in the housing to that side of the feedthrough body portion adjacent the cavity. The rod has a hole drilled in the end on the cavity side and a spring loaded plunger contact is inserted barrel first in the hole so that its plunger contact protrudes from the feedthrough body in position to contact the elements of the transducer when the feedthrough body portion is in sealing position in the assembly.

BRIEF DESCRIPTION OF THE DRAWINGS

In the drawings, where like reference characters identify like parts:

FIG. 2 is a cross section showing the transducer construction and the means for mounting the transducer.

FIG. 3 is a cross section showing the bulkhead of the transducer assembly and its electrical feedthrough.

FIG. 4 is an exploded view showing details of the anti-rotation locknut arrangement used to prevent rotation of the electronics housing with respect to the pressure receiving body. This view shows the pressure receiving body with the bulkhead removed.

FIG. 5 is a cross section showing details of the spring loaded contacts of the feedthrough in the bulkhead.

DESCRIPTION OF THE PREFERRED EMBODIMENT

Figure 1:
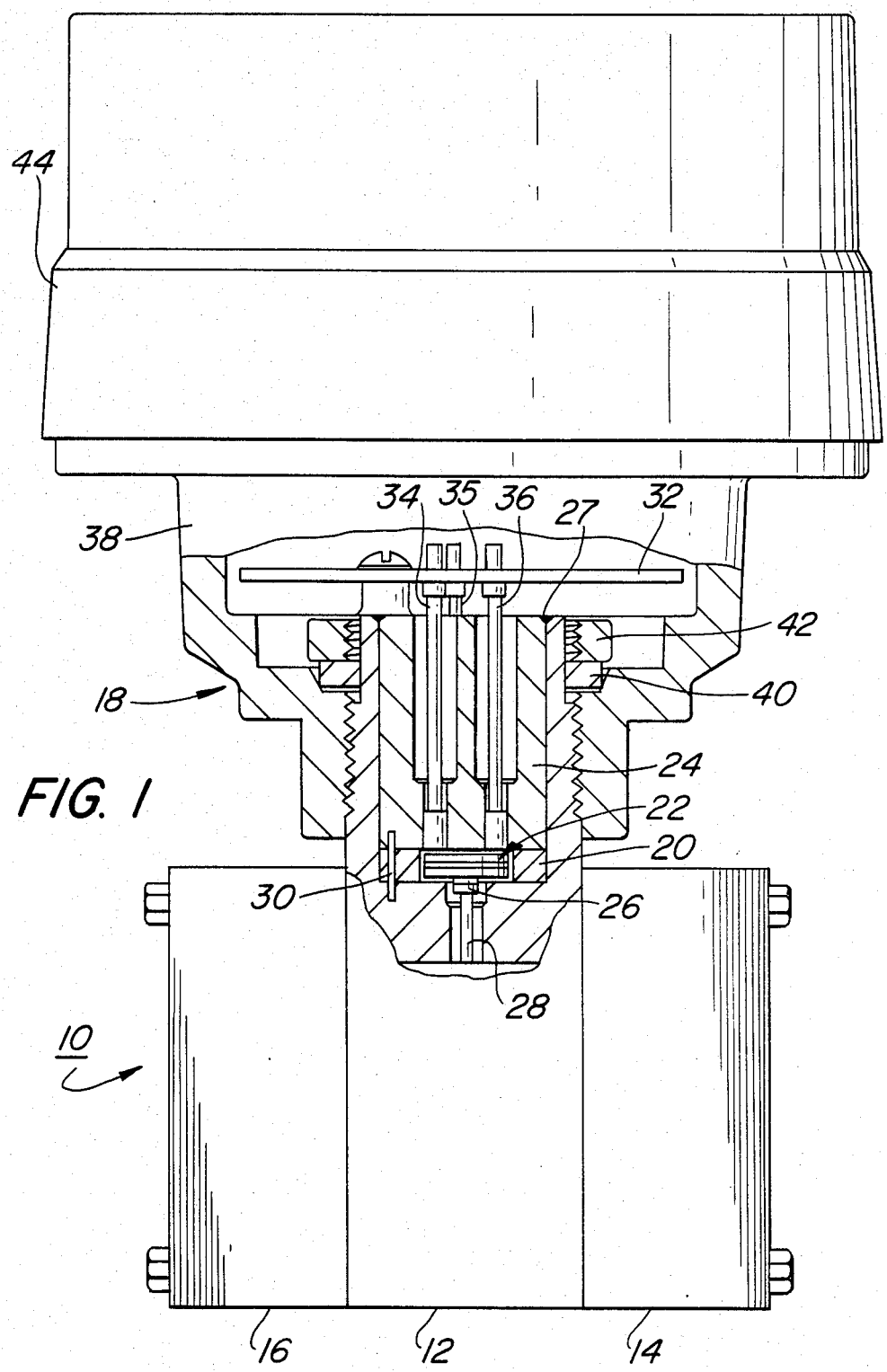
FIG. 1 is a front elevation of a pressure transducer assembly with that part which houses the pressure transducer itself broken away to show the transducer, its mounting, and the electrical feedthrough in cross section.

FIG. 1 is a view, partially in section, of a differential pressure measuring transducer assembly which includes a pressure receiving section 10 having a pressure receiving body 12 which in turn has mounted to it a flange 14 on the high pressure side and a flange 16 on the low pressure side. The pressure receiving body is constructed to accomodate at its pressure receiving end the usual barrier diaphragms, covered by the flanges 14 and 16, as well as high pressure and low pressure receiving chambers and any overprotection means required. Since these elements of the pressure receiving section are well known in the art, and since they form no part of the present invention, they are not shown in FIG. 1 or the other drawings.

The transducer section 18 is shown in cross section in FIG. 1. In this section the pressure measuring end of a stainless steel pressure receiving body 12 is shown having a large bore for accepting a washer shaped spacer 20 which in turn accepts a pressure transducer in its interior. The spacer and transducer are surmounted by a Kovar cylindrical bulkhead forming a feedthrough body 24 which is welded in place to the pressure receiving body 12 at the weld point 27. This weld must be strong enough to withstand the maximum static pressure to which the transducer is to be subjected. The pressure measuring section also includes the transducer 22 and mounting means for securing the transducer to the pressure measuring body 12. This mounting means includes a silicon stub 26 and an alloy mounting tube 28 which has approximately 54% iron, 28% nickel, and 18% cobalt, such as the alloy known as Kovar.

Spacer 20 and feedthrough body 24 are assembled in the proper orientation on the pressure receiving body 12 by means of the locator pin 30.

The electrical connection from a circuit board 32 to the transducer 22 is provided by the electrically conducting rods 34, 35, and 36, which fit in holes in the feedthrough body 24 and are sealed to the feedthrough body by a glass to metal seal at the end of the feedthrough body closest to the pressure transducer. Holes are bored in the ends of the rods nearest the transducer so that those ends will accept spring loaded plunger type contacts which provide the electrical contact to the transducer when the feedthrough is assembled in place.

The measuring section 18 is covered by an electrical housing 38 which is threadably mounted onto a shaft like end of the pressure receiving body 12 and held in place with a locking c-ring 40 and a nut 42. The housing 38 has a cover 44 threaded on it to protect the circuit components and other elements in the housing.

FIG. 2 shows in cross section the details of the pressure transducer and its mounting as well as the manner in which they both fit into the pressure measuring section 18.

The transducer 22 has a silicon diaphragm 50 which has a circular recess etched into its opposite faces to thereby form the deflecting section of the diaphragm. The diaphragm, being of highly doped silicon, is a conductor and also forms one electrode of the transducer. Parallel silicon support plates 52 and 54 are anodically bonded to the opposite sides of the diaphragm along its periphery to thereby form pressure receiving cavities 56 and 58. The anodic bonding requires the use of a nonconductor such as borosilicate glass between the parts to be bonded. The glass will also serve to electrically isolate the diaphragm from the fixed electrodes of the transducer. These fixed electrodes are shown as deposited thin films of metal 60 and 62, which are laid down on the borosilicate glass layers 64 and 66, respectively. It will be noted that the borosilicate glass layers extend over the entire surface of the support plates 52 and 54 opposite the deflecting portion of the diaphragm so that upon deposition of the electrodes 60 and 62 the spacing between those fixed electrodes and the diaphragm is determined solely by the depth of the etched recesses in the diaphragm. This construction creates on each side of the transducer a stray capacitance $C_2$ (through the borosilicate glass) which is in parallel with the transducer capacitance $C_1$. The effect of the stray capacitance, of course, is to reduce the transducer output signal. Therefore, it is desireable to minimize $C_2$ by maximizing the thickness of the borosilicate glass while at the same time minimizing the effects of Young's modulus by minimizing the thickness of the glass. Obviously these two desires are conflicting and it is necessary to determine the thickness of the glass by establishing the desired specifications for the transducer as to span shift.

Each of the support plates has a pressure communicating passage through it. These are shown in FIG. 2 as 68 and 70. These passages are coated with a thick film of metal as is the entire top of plate 54 and a part of the bottom of plate 52 as well as contact pad areas 78 and 80. These metal deposits provide the conductive pads for connecting to the fixed plates 60 and 62 as well as diaphragm 50.

Electrical contact between circuit board 32 by way of feedthrough 24 is provided by the spring contacts 72, 74, and 76, respectively. Contacts 72 and 76 make contact through the conducting pads 78 and 80 which are deposited on the diaphragm and the lower plate, respectively, in the sections of the transducer shown broken away for that purpose.

The transducer 22 is spaced from the body 12 and spacer 20 which is utilized to provide support for the feedthrough body 24 spacing it from the transducer. The spacer 20 has V-grooves in its bottom surface to provide a passage from the high pressure passage 82 for silicone oil which fills the cavities of the tranducer assembly. By virtue of these spaces the outside surfaces of the transducer and the high pressure aperture 68 are subjected to the pressures on the high pressure side of the line connected to the high pressure side of the pressure receiving section 10 of FIG. 1. The low pressure side of the pressure receiving section 10 is connected to the aperture 70 by way of a passage through the Kovar alloy tube 28 and the silicon stub 26 which connects with low pressure region 84 of the pressure measuring body 12. It should be noted that since the lower support plate 52 is spaced from the body 12 the only firm connection between the transducer and the body 12 is provided by the weld 90. That weld firmly affixes the tube 28 to the body 12. The top end of the tube 28 has reduced diameter which fits inside the hole in silicon stub 26 and is affixed at the joint 94 as by either soldering, brazing or by the use of epoxy, for example. To accomodate soldering or brazing the silicon stub shown is provided with a metal film on its lower surface and its interior. The stub 26 is anodically bonded to the lower support plate 52 by way of an interposed thin borosilicate glass layer 98 between the stub and the plate.

For the purpose of minimizing the effects of Young's modulus in the mounting structure it is desirable to make the diameter of the tube where it fits into the stub a minimum value and to make the thickness of the glass layer 98 as thin as possible. It is also desirable to make tube 28 as long as possible in order to increase the mechanical isolation of the tranducer with respect to the pressure receiving body.

Exemplary dimensions of the elements of the transducer and its mounting are as follows:

diaphragm 50—0.5 in. square and 0.0078 in. thick with recesses 0.0006 in. deep
plates 52,54—0.5 in. square and 0.072 in. thick
glass layers 64,66—thickness of 0.008 in.
glass layer 98—0.0006 in. thick
stub 26—0.1 in. high×0.2 in. square
tube 28—0.125 in. dia.×0.3 in. long FIG. 3 shows in cross section the electrical feedthrough arrangement for making an electrical connection between the electrical circuits on the circuit card 32 and the elements of the transducer 22. Since three connections are required for the present transducer, three holes are drilled in the feedthrough body 24. The rods 34 and 36 are electrical conducting elements shown inserted in two of those holes. These rods are sealed to the circumference of the respective holes by glass pressure seals 100 and 102. The ends of the rods toward the transducer are drilled to provide a hole in the end of each rod of diameter smaller than the rod for a distance less than the length of the rod as required to accomodate spring loaded plunger type contacts 104 and 106 shown inserted in place in the rod 34 in FIG. 5.

As shown in FIG. 5, the contact assembly 104, which is exemplary of the other assemblies, includes a barrel 105 in which there is mounted a coil spring for biasing the contact 76 toward the transducer. The dimensions of the contacts are such that when the feedthrough body 24 is welded in place in the pressure receiving body 12, as shown in FIG. 3, the contacts maintain a complete circuit between the circuit card and the appropriate elements of the transducer. In order that good contact will be made the spring loaded plunger contacts should be gold plated. While the manner in which two of the feedthrough rods are mounted in the body 24 is shown in FIG. 3, it will be understood that the third rod 35 is similarly fitted into the body 24. The benefits derived from using contacts of the above described type include the benefit of having a means for contacting the transducer without taking up much space in the cavity where the transducer is mounted. The cavities of pressure transducers of this type typically are filled with a silicone oil, as previosly mentioned. It is desireable to minimize the volume of that oil in order to minimize the effect of the temperature coefficient of the oil and also to minimize the amount of oil available to be compressed when there is a pressure increase in the line. The spring loaded contacts used in this invention are effective in minimizing the volume of oil since most of the contact structure is located inside the feedthrough body itself rather than in the transducer cavity as would be necessary if other spring type contacts were used.

As is also shown in FIG. 3, the rods 34, 35, and 36 are received by spring contacts 110, 112, and 114 in the circuit board 32 so that contact with the circuit is made. The contacts 110, 112, and 114 may be of the type which utilizes coiled springs circling around the interior of their sockets to frictionally engage the inserted rods.

An electrical feedthrough of the type shown in FIG. 3 has certain benefits when constructed as shown. Thus, the arrangement of the three rods 34, 35, and 36 provides a coaxial system in which the conductors are each isolated by a ground plane and a minimum of stray capacitance is present. As shown, contact with the transducer is made without the need to have leads going around the transducer to the bottom. This keeps the volume of the silicone oil to a minimum. Also, the contact points on the transducer are kept as far as possible from the deflecting area of the diaphragm to reduce the effects of the forces transmitted by the contact arrangement.

It should be noted that the feedthrough body is made of the Fe-Ni-Co alloy known as Kovar and is dimensioned so that with changes in temperature the stainless steel body 12 and the feedthrough body 24 have thermal expansions that are such that there is a change in the spacing between the two, below the weld 27, such that it is substantially equal to the change in volume of the silicone oil resulting from the temperature change or provides part of the compensation for such a change in volume. This compensation may, of course, may be shared with other parts of the transducer assembly, such as may be found in the pressure receiving section of the assembly.

FIG. 3 also shows in cross section the locking assembly which is used to keep the housing 38 from being rotatable with respect to the pressure receiving body 12 to which it is threadably engaged. An exploded view is shown in FIG. 4. It will be noted that the housing surface 120, which is to be mounted on the threaded pressure receiving body 12, has a recess 119 around its threaded hole. The recess has tapered sides 122 which have a geometric shape or profile in the plane of the housing surface which will resist rotation. Thus, the shape should be non-circular. It may, for example, have one flat side. Preferably the recess has many flat sides. It can, therefore, be hexagonal in configuration, as shown.

The threaded end of the pressure receiving body 12 has opposing parallel flats or relief surfaces 124 and 126. A locking c-ring 40 is constructed to have a slot providing an open end to a central aperture which fits over the flat surfaces so that any rotation of the ring will cause a rotation of the body 12. The outer periphery of the ring has a profile of geometry to match that of the recess sides 122 except that the sides of the ring are straight, that is they are not tapered as are the recess sides. The dimensions of the ring are such that the straight sides of the ring engage the tapered sides of the recess, as shown in FIG. 3. Preferably the ring is made of harder material than the housing 38.

After the housing 38 is threaded onto the end of body 12 it must be backed off a small amount to a point where the ring can be slipped over the end of body 12 and fit in the housing recess 119. Then the nut 42 is threaded onto the body 12 and is thightened. As the nut is tightened the tapered sides of the recess 119 cause the sides of the ring to cam over the sides of the recess. This causes the ring 40 to be elastically deformed so as to grasp the flats 124 and 126 after which the ring bites into the tapered sides 122 of the recess 119 plastically deforming the tapered sides 122, as shown. This causes the fit of the ring in the recess to be so tight that there will not be any rotation of the housing with respect to the pressure receiving body 12. The purpose of this locking assembly is to prevent a rotation of parts such as the circuit board 32 with respect to the rods 34, 35, and 36 which the board contacts. This problem with rotation can arise without there being any intent on the part of the user of the transducer assembly to rotate the housing. The rotation can, for example, occur when conduit is being connected to the housing during installation. With the present arrangement even the application of larger than normal rotational forces on the housing will not damage the assembly.

What is claimed is:

1. In a pressure transducer assembly having an electrical circuit mounted in a housing of said assembly subjected to ambient pressure conditions and a pressure transducer whose electrical elements have contact areas all on one side mounted in a cavity of a pressure receiving body of said assembly which cavity is subjected to high line pressures, a feedthrough contact means for electrically connecting said circuit and said transducer contact areas while sealing the high line pressure in said cavity, comprising:

a feedthrough body portion for providing a pressure seal for said cavity;

at least one electrically conducting rod carried by said feedthrough body portion, said rod extending from said circuit on the side of said body portion adjacent said housing to that side of said body portion adjacent said cavity, said rods having holes drilled in their end from said cavity side; and spring loaded plunger contacts inserted barrel first in said holes so that their plunger contacts protrude from said feedthrough body in position to contact the contact areas of said transducer on assembly of said feedthrough body portion in sealing position in said assembly.

2. A feedthrough contact means as set forth in claim 1 in which the feedthrough body is welded in said pressure receiving body to seal said cavity and said rod is located in a hole through the feedthrough body so that the rod is sealed against pressure leakage by a glass seal in the space in said hole between the rod and the feedthrough body.

3. In a pressure transducer assembly having a pressure receiving body with a cavity subjected to high line pressures and carrying a pressure transducer of the capacitive type mounted in said cavity and with a circuit board requiring connection to said transducer being mounted in a housing of said assembly which is mounted to said body, means for sealing said cavity in the region between said housing and said cavity and providing an electrical feedthrough contact means for electrically connecting said circuit board to said transducer, said contact means comprising:

electrical conducting elements for feeding electrical circuits between said transducer and said board; and spring loaded plunger type contacts mounted in electrical contact with said board and positioned so that their spring loaded plungers contact the transducer when said transducer is in its operating position in said cavity.

4. An electrical connecting means for connecting a pressure transducer to an associated circuit through a bulkhead welded in the pressure receiving body of the assembly containing said transducer, comprising:

a rod mounted in a hole in said bulkhead to conduct electrical current therethrough, said rod being sealed to the periphery of said hole to form a pressure seal;

a hole formed in the end of said rod facing said transducer; and a spring loaded plunger type contact inserted in said hole so that its contact protrudes to connect to said transducer upon assembly of the feedthrough and transducer.

5. An electrical connecting means as set forth in claim 4 in which:

the fill fluid in the pressure transducer and associated cavities of the assembly is silicone oil; and the bulkhead is cylindrical, is made of an alloy having approximately 54% iron, 28% nickel, and 18% cobalt, is welded into said pressure receiving body at the end of the bulkhead away from the transducer, and is dimensioned so that as the spacing between its periphery and the pressure receiving body change with changes in temperature the resulting volume variations in that space tend to be equal to the volume variations of the silicone oil fill fluid under those same temperature conditions.

* * * * *